United States Patent [19]

Lundberg et al.

[11] Patent Number: 4,970,260
[45] Date of Patent: Nov. 13, 1990

[54] NOVEL VISCOSIFIERS FOR SALT-CONTAINING SOLUTIONS BASED ON POLYMER COMPLEXES

[75] Inventors: Robert D. Lundberg, Bridgewater; Robert R. Phillips, Spring Lake Hts.; Dennis G. Peiffer, East Brunswick, all of N.J.

[73] Assignee: Exxon Research and Engineering Company, Florham Park, N.J.

[21] Appl. No.: 198,525

[22] Filed: May 25, 1988

Related U.S. Application Data

[63] Continuation-in-part of Ser. No. 70,326, Jul. 6, 1987, abandoned, which is a continuation-in-part of Ser. No. 713,049, Mar. 18, 1985, abandoned, which is a continuation-in-part of Ser. No. 547,800, Nov. 2, 1983, abandoned.

[51] Int. Cl.$^5$ .................... C09K 3/00; C08L 39/06; C08L 39/08; C08L 41/00
[52] U.S. Cl. .................... 524/516; 524/501; 524/521
[58] Field of Search .............. 524/516, 521, 501

[56] References Cited

U.S. PATENT DOCUMENTS 3,660,338  5/1972  Economou ............... 260/29.6 NR
3,867,330  2/1975  Frisque ................. 260/29.6 NR

*Primary Examiner*—C. Warren Ivy
*Attorney, Agent, or Firm*—Richard E. Nanfeldt

[57] ABSTRACT

A polymeric solution comprising: water; about 0.005 to about 0.5 moles of an inorganic acid, an inorganic case or an inorganic salt per 100 ml of such water; and about 0.1 to about 5.0 grams of a polymeric complex per 100 grams of said water, said polymeric complex produced by the interaction of a first water soluble copolymer formed from a water soluble nonionic monomer and an anionic comonomer by a free radical copolymerization, said first water soluble nonionic monomer being selected from the group consisting of acrylamide, methacrylamide and vinylpyrrolidone, said anionic comonomer being about 1 to about 35 weight percent of said first water soluble copolymer, said anionic comonomer containing anionic groups, said anionic comonomer being selected from the group consisting of metal styrene sulfonate, metal vinyl sulfonate, and a metal salt of 2-acrylamide-2-methyl propane sulfonate; and a second water soluble copolymer formed from a second water soluble monomer and a cationic comonomer by a free radical copolymerization, said second water soluble monomer being selected from the group consisting of acrylamide, methacrylamide and vinyl pyrrolidone, said cationic comonomer being about 1 to about 34 weight percent of said second water soluble copolymer, said cationic comonmer containing cation group, said cationic comonmer being selected from the group consisting of N,N,N-trimethylammoniumpropylmethacrylamide and vinylpyridine or their quarternary salts, wherein the molar ratio of anionic to cationic functional groups in the water soluble polymer complex is about 50/1 to about 1.2/1 or from about 0.8/1 to about 1/50, said ratio always being such that there is at least an excess of said water soluble copolymers over the other said water soluble copolymer of at least about 20 mole percent.

1 Claim, No Drawings

NOVEL VISCOSIFIERS FOR SALT-CONTAINING SOLUTIONS BASED ON POLYMER COMPLEXES

FIELD OF THE INVENTION

The present invention relates to viscosification agents for salt solutions in which the viscosification agents are mixtures of a water soluble polymer backbone containing an anionic comonomer and a copolymer of a water soluble polymer backbone containing a cationic comonomer.

BACKGROUND OF THE INVENTION

There has been a major need for techniques to viscosify hydrocarbon and aqueous solutions so as to control viscosity of such diluents broadly. Typically, a variety of polymers, generally high in molecular weight, are employed to achieve this objective. Unfortunately, solutions based on such polymers suffer major problems in that: (a) large amounts of polymers, or else high molecular weight polymers, are required to achieve a suitable degree of viscosification; (b) the resulting polymer solutions exhibit viscosities which diminish markedly as polymer concentration is reduced or as temperature is increased; (c) these conventional solutions typically are shear thinning as well.

We have observed, in the course of previous research on associating polymers, that sulfonate ionomers in mixed solvents based on hydrocarbons and alcohols can give rise to solutions whose viscosities actually increase or remain essentially constant as temperature increases. While these phenomena are of scientific and technological interest, all attempts to extend these findings to aqueous systems were until recently unsuccessful. We have now found, however, that a combination of a water soluble polymer bearing a low to moderate level of anionic groups, and a second water soluble polymer bearing cationic groups at a low to moderate level, when combined under precisely defined stoichiometric ratios, will give rise to solutions which: (a) display very unusual viscosity-temperature effects such that viscosity can increase with temperature; (b) display very unique viscosity-concentration effects such that viscosity can actually increase as polymer concentration is reduced.

PRIOR ART

In recent years, interpolymer complexes have received considerable attention in the literature due to their interesting and unique properties and their similarity to certain biological systems. In most instances, these complexes are formed by intimately mixing aqueous solutions containing high-charge density polyelectrolytes possessing opposite charge. When these polymer molecules are combined in solution, the interaction between oppositely charged sites will cause the release of their associated counterions forming the complex. The counterions are now free to diffuse into the bulk solution. Normally, phase separation occurs upon prolonged standing.

Significantly, these interpolymer complexes are normally 1:1 compositions of the polyanions and polycations. The neutrally charged complex swells and absorbs both water and electrolyte when immersed in aqueous electrolyte solutions of increasing concentration. Nonstoichiometric complexes, on the other hand, behave as a rather conventional ion-exchange resin in electrolyte solutions. In both cases, however, dissolution does not occur in these high ionic strength media. In fact, the latter complex can be cold-drawn and deformed as easily as a conventional thermoplastic resin. A. S. Michael [(I&EC, 57, 32 (1965)] has shown these "intractable polysalt precipitates" can dissolve (i.e., codissolved without reaction) in selected ternary solvent mixtures comprising water, a water-miscible organic solvent (e.g., acetone) and a strongly ionized inorganic electrolyte (e.g., NaBr). These solutions do yield a homogeneous, transparent viscous solution. It is further noted that a soluble complex is formed in an aqueous solution with the addition of an excess high-charge density polyelectrolyte (E. Tsuchida et al, J. Polymer Sci., Polym. Chem. Ed., 10, 3397 (1972). Few studies have focused on the viscosification aspects (in either salt or salt-free solutions) of these materials and even less work appears on low-charge density polycomplexes. In these studies, the viscosity measurement is used only as a tool to study the extent and mechanism of complex formation.

Polymeric materials are quite useful as viscosity enhancers when dissolved in an appropriate solvent system. The principle reason for this behavior is due primarily to the large volume which a single macromolecular chain can occupy within the solvent. An increase in the size of the chain produces a concomitant enhancement in the solution viscosity. Furthermore, this effect is maximized when the polymer is dissolved in a "good" solvent. Thus, in general, a water soluble polymer is appropriate for increasing the viscosity of aqueous systems. In this regard, high charge density polyelectrolytes are very useful and are the most commonly used materials. However, the solution properties of these materials are directly dependent upon molecular weight, charge density and inversely proportional to salt concentration. In most of the common synthetic polyelectrolytes, it is difficult, from a synthetic viewpoint, to obtain ultrahigh molecular weight and/or high charge density. One approach to this problem is to increase the concentration of polymer, but this solution is undesirable from an economic point of view.

The instant invention discloses that low-charge density interpolymer complexes are useful in viscosifying high ionic strength aqueous solution systems. More importantly, these complexes possess a substantially higher viscosity than the corresponding individual low-charge density copolymer components in an acid, base or salt water system. Even more interesting is the observation that these materials are soluble in a high ionic strength aqueous solution. Furthermore, these solutions possess a special and unexpected attribute of relatively constant viscosity (i.e., isoviscous effect) as the temperature is varied. The factors are unexpected since the generally tendency of high-charged density interpolymer complexes is to be rather insoluble in these environments. As a result, these latter materials have poor viscosification properties and thickening efficiency.

Numerous U.S. Patents have taught methods of sulfonating a variety of elastomeric and thermoplastic polymers. These are U.S. Pat. Nos. 3,642,728; 3,836,511; 3,072,618; 3,072,619; 3,847,854; 3,870,841 and 3,877,530. However, none of these references teach the process for preparing the complex polymers of the instant invention, nor do they recognize that the complex polymers of this class are excellent viscosification agents for aqueous solutions.

SUMMARY OF THE INVENTION

The present invention relates to viscosification agents for salt solutions in which the viscosification agents are mixtures of a water soluble polymer backbone containing an anionic comonomer and a copolymer of a water soluble polymer backbone containing a cationic comonomer.

GENERAL DESCRIPTION OF THE INVENTION

The aqueous viscosification agents for high strength ionic solutions of the instant invention are formed by the interaction of a mixture of two different polymers which interaction forms a polymer complex which is dissolved in the high strength ionic solution. There are a number of copolymers which are suitable for forming the polymer complexes which are soluble in the aqueous solution of high ionic strength.

A preferred system is comprised of an interaction mixture of (A) copolymers of acrylamide and a neutralized styrene sulfonate where the sulfonate content ranges from about 1 weight percent up to about 50 weight percent and (B) copolymers of acrylamide and a quaternary ammonium salt such as N,N,N,-trimethylammonium-propylmethacrylamide:

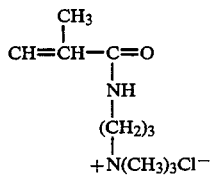

wherein the level of ionic monomer again ranges from about 1 weight percent to about 50 weight percent.

A variety of other polymer systems can be employed in this invention with the following constraints. Copolymer (A) should be based on a largely water soluble polymer backbone containing an anionic comonomer. The water soluble polymer backbone of copolymer (A) is selected for the group consisting of polyacrylamide, polyvinyl pryolidone, polyethylene oxide, polyvinyl alcohol and polymethacrylamide thereof, wherein polyacrylamide is preferred. The anionic comonomer of copolymer (A) is selected from the group consisting of styrene sulfonate, vinyl sulfonate, allyl sulfonate, acrylate, acrylamidopropyl sulfonate, wherein the sulfonate groups are neutralized with an ammonium cation or a metal cation selected from the group consisting of Groups IA, IIA, IB and IIB of the Periodic Table of Elements. Copolymer (A) contains about 1 to about 50 weight percent of the anionic comonomer, more preferably about 2 to about 25 and most preferably about 3 to about 20. The number average molecular weight of copolymer (A), as determined by gel permeation chromatography, or some other characterization technique is about 10,000 to about 1,000,000 more preferably about 25,000 to about 500,000 and most preferably about 30,000 to about 500,000. Copolymer (A) is prepared by copolymerization techniques involving dissolution of both monomers in a suitable solvent such as water, adding appropriate free radical initiators as known in the art and conducting the polymerization to high conversion. Other techniques can also be employed.

Copolymer (B) should be based on a largely water soluble polymer backbone containing a cationic species. The water soluble polymer backbone of copolymer (B) is selected from the group consisting of polyacrylamide, polyvinyl pyrrolidone, polyethylene oxide, polyvinyl alcohol and polymethacrylamide, wherein polyacrylamide is preferred. The cationic comonomer of copolymer (B) is selected from the group consisting of N,N,N-trimethylammoniumpropylmethacrylamide, vinyl pyridine and vinyl ditolyl guanadine. Copolymer (B) contains about 1 to about 50 weight percent of the cationic comonomer, more preferably about 2 to about 35, and most preferably about 3 to about 30. The number average molecular weight of Copolymer (B), as determined by gel permeation chromatography, is about 10,000 to about 2,000,000, more preferably about 20,000 to about 1,000,000, and most preferably about 30,000 to about 500,000. Copolymer (B) is prepared by techniques described in preparation of copolymer A.

An important characteristic of the materials employed in this invention is the stoichiometry of the ionic species when polymers (A) and (B) are blended together. A wide variation in such stoichiometries has been explored wherein the ratio of anionic/cationic species varies from 30/1 to 1/30. An even wider range of such stoichiometries is believed to be within the scope of this invention. However, it has been found that when this ratio is in the vicinity of 1/1, the solution behavior of such complexes is unremarkable. However, upon substantial departures from this ratio in aqueous systems, the resulting solutions exhibit unusual viscosity behavior as a function of temperature or concentration.

Accordingly, the ratio of the anionic/ cationic functional groups can be from about 50/1 to about 1.1/1, more preferably about 30/1 to about 1.2/1 and from about 0.9/1 to about 1/50, more preferably about 0.8/1 to about 1/50. The polymer complex of the instant invention must be soluble in distilled water. It is critical that the polymeric complex of the instant invention must be soluble in the polymeric solutions to form a true solution and not just dispersed therein because if the polymer complex is only dispersed in the water this system will lack long term stability. If a true solution, as in the instant invention, is formed of the polymer complex being completely (100%) dissolved in the water than the formed polymeric solution will exhibit long term stability.

The complex mixture of copolymers (A) and (B) are ideally prepared by mixing separate high strength ionic solutions of the copolymers (A) and (B) together. Alternatively, the polymeric complex can be prepared by the interaction of copolymers (A) and (B) in solid bulk or by precipitation from an aqueous solution, wherein the polymer complex was formed in the aqueous solution by the interaction of the polymers (A) and (B). The solid water soluble polymer complex of polymers (A) and (B) is then dissolved in a high ionic strength aqueous solution to form the solutions of the polymeric complex of the instant invention. The method of forming the polymeric solution of the polymeric complex is not critical and any one of the aforementioned processes can be employed, as well as any other process that may be envisioned by one skilled in the art of forming of polymeric solutions. The high strength ionic solution of copolymer (A) contains about 0.1 to about 5 grams of copolymer (A) per 100 ml. of water, more preferably about 0.2 to about 5 and most preferably about 0.5 to about 2, wherein the solution contains about 0.0005 to about 0.5 moles of an organic acid, inorganic base or inorganic salt such as hydrochloric acid, sodium chloride or sodium per 100 ml. of water, more preferably about 0.001 to about 0.5 and most preferably 0.01 to about 0.5. The aqueous solution of copolymer (B) contains about 0.1 to about 5 grams of copolymer (B) per 100 ml. of water, more preferably about 0.2 to about 5, and most preferably about 0.5 to about 2.

The polymeric solution of the instant invention comprises water, about 0.005 to about 0.5 moles of an inorganic acid, an inorganic base or an inorganic salt per 100 ml of the water, and about 0.1 to about 5.0 grams of a polymeric complex per 100 grams of the water, the polymeric complex being produced by the interaction of a first water soluble copolymer formed from a water soluble nonionic monomer and an anionic comonomer by a free radical copolymerization, said first water soluble nonionic monomer being selected from the group consisting of acrylamide, methacrylamide and vinyl pyrrolidone, said anionic comonomer being about 1 to about 35 weight percent of said first water soluble copolymer, said anionic comonomer being selected from the group consisting of metal styrene sulfonate, metal vinyl sulfonate and a metal salt of 2-acrylamide-2-methyl propane sulfonate; and a second water soluble copolymer formed from a second water soluble copolymer formed from a second water soluble monomer and a cationic comonomer by a free radical copolymerization, said second water soluble monomer being selected from the group consisting of acrylamide, methacrylamide and vinyl pyrrolidone, said cationic comonomer being about 1 to about 35 weight percent of said second water soluble copolymer, said cationic comonomer containing cation groups, said cationic comonomer being selected from the group consisting of N,N,N-trimethylammoniumpropylmethacrylamide and vinyl pyridine or their quaternary salts, wherein the molar ratio of anionic to cationic functional groups in the water soluble polymer complex is about 50/1 to about 1.2/1 or from about 0.8/,1 to about 1/50, said ratio always being such that there is at least an excess of one of said water soluble copolymers over the other said water soluble copolymer of at least about 20 mole percent.

The polymer complexes of the instant invention are soluble in both fresh and salt water due to the unique interaction of the anionic groups (sulfonate groups and the cationic groups of the quaternary salts). The instant invention does not require an oily, latex system to separate the interacting polymers of the complex and, in fact, the oil would be severely detrimental to the formation of the complex. The formation of the polymer complexes of the instant invention do not require a water-in-oil emulsify agent, and, in fact, such an emulsifying agent would prevent the formation of the polymer complexes of the instant invention. Additionally, a water-soluble ionization suppressor is not required to form the polymer complexes of the instant invention.

DESCRIPTION OF THE PREFERRED EMBODIMENTS

The following examples illustrate the present invention without; however limiting the same hereto.

EXAMPLE I

A representative example for the synthesis of acrylamide (AM)-sodium styrene sulfonate (SSS) copolymer is outlined below.

Into a 1-liter, 4-neck flask add:
25 g acrylamide
12.75 g sodium styrene sulfonate
500 ml. distilled water The solution was purged with nitrogen gas for one hour to remove dissolved oxygen. As the nitrogen gas purge began, the solution was heated to 55° C. At this point, 0.05 g potassium persulfate was added to the solution. After 24 hours, the polymer was precipitated from solution with acetone. Subsequently, the resulting polymer was washed several times with a large excess of acetone and dried in a vacuum oven at 60° C. for 24 hours. Elemental analysis shows a sulfur content of 4.16 weight percent which corresponds to 11.2 mole percent sodium styrene sulfonate.

A representative example for the synthesis of an acrylamide, methacrylamidopropyltrimethylammonium-chloride (MAPTAC) copolymer is essentially identical to the previous polymerization, except for the substitution of SSS for an appropriate quantity of MAPTAC, as shown below.

25.0 g acrylamide
27.4 g MAPTAC (50% solution)

The reaction is carried out utilizing the above specifications. Elemental analysis shows a chlorine content of 4.75 weight percent corresponding to 11.9 mole percent MAPTAC.

As is well-known to those versed in the art, the level of ionic monomers attached to the growing polymer chain is directly related to the initial concentration of the reacting species. Therefore, modulation of the ionic charge within the polymer structure was accomplished through changing the initial anionic or cationic vinylic monomer concentration.

The interpolymer complexes were formed by dissolving the appropriate weight of each copolymer into an aqueous acid, base or salt solution to the desired polymer level. The solutions are added together and vigorously mixed. The specific overall charge level within this solution is calculated by assuming that a reaction will take place between all unlike charges leaving any residual charge unaffected. This assumption is quite reasonable since low-charge density copolymers are used in this instant invention.

EXAMPLE II

The following table shows typical viscosity behavior (0° to 75° C.) of a 0.1 M sodium chloride solution containing an AM-co-MAPTAC:AM-co-SSS interpolymer complex. The complex was prepared so that it possessed a residual charge as designated by the ionic monomer molar ratio, SSS/MAPTAC. This particular complex contains a 2.3/1.0 molar ratio formed from the appropriate concentration of a 32.9 mole percent SSS-co-AM material and a 3.6 mole percent MAPTAC-co-AM material. These latter numbers refer to the ionic content within the polymer structure, respectively. The concentration of complex in solution was 2 g/dl.

| Temperature (°C.) | Viscosity (cps) 0.1 M NaCl | Viscosity (cps) Salt-Free |
|---|---|---|
| 0 | 76 | 65,000 |
| 25 | 87 | 39,000 |
| 50 | 74 | 15,500 |
| 75 | 56 | 550 |

As a point of comparison, the individual copolymer components, AM-co-MAPTAC and AM-co-SSS have viscosities of 220 cps and 210 cps, respectively, in fresh water at 2 g/dl. With the addition of 0.1 M NaCl the viscosity of AM-co-MAPTAC and AM-co-SSS is approximately 34 cps and 19 cps, respectively, at 2 g/dl. An examination of the data shows that the soluble interpolymer complex is dramatically more effective at low polymer levels as a high ionic strength aqueous phase viscosifier than either of two individual components. Moreover, the viscosity values are significantly larger than the mean value of each copolymer In addition, we note that the viscosity of the complex in a salt-free solution progressively deteriorates with increasing temperature, while an isoviscous effect occurs in the high ionic strength media This is a new and unexpected result. Even though the underlying mechanism is not completely understood, this phenomena has a variety of potential technological applications.

EXAMPLE III

In this example, the ionic strength of the NaCl solution in Example II was decreased (0.01 M) and again an isoviscous effect is observed The appropriate data are given in the following table.

| Temperature (°C.) | Viscosity (cps) |
|---|---|
| 0 | 110 |
| 25 | 165 |
| 50 | 141 |
| 75 | 105 |

EXAMPLE IV

In the following table is a typical example of the viscosity temperature behavior of aqueous solutions (2 g/dl.) containing a higher ionic monomer molar ratio (4.6 SSS/MAPTAC) at a high ionic strength (0.02 M NaCl).

| Temperature (°C.) | Viscosity (cps) |
|---|---|
| 0 | 190 |
| 25 | 275 |
| 50 | 245 |
| 75 | 175 |

The data show that by increasing the SSS/MAPTAC ratio, significant increases in viscosity result. Furthermore, an isoviscous effect is observed. Again, as a point of comparison, the individual copolymer components of the complex have a significantly lower viscosity (or their mean viscosity value) under identical experimental conditions.

What is claimed is:

1. A polymeric solution consisting essentially of:
   (a) water;
   (b) about 0.005 to about 0.5 moles of an inorganic acid, an inorganic base or an inorganic salt per 100 ml of such water; and
   (c) about 0.1 to about 5.0 grams of a polymeric complex per 100 grams of said water, said polymeric complex being soluble in distilled water at 25° C. at a polymeric complex level of 2 grams per 100 ml of said distilled water being produced by the interaction of:
   (i) a first water soluble copolymer formed from a first water soluble nonionic monomer and an anionic comonomer by a free radical copolymerization, said first water soluble nonionic monomer being selected from the group consisting of acrylamide, methacrylamide and vinylpyrrolidone, said anionic comonomer being about 1 to about 50 weight percent of said first water soluble copolymer, said anionic comonomer containing an anion groups, said anionic comonomer being selected from the group consisting of metal styrene sulfonate, metal vinyl sulfonate, and a metal salt of 2-acrylamide-2-methyl propane sulfonate, wherein said metal of said anionic comonomer is selected from the group consisting of Groups IA, IIA, IB and IIB of the Periodic Table of Elements, and
   (ii) a second water soluble copolymer formed from a second water soluble monomer and a cationic comonomer by a free radical copolymerization, said second water soluble monomer being selected from the group consisting of acrylamide, methacrylamide and vinyl pyrrolidone, said cationic comonomer being about 1 to about 35 weight percent of said second water soluble copolymer, said cationic comonomer containing a cation group, said cationic comonomer being selected from the group consisting of N,N,N-trimethylammonium-propylmethacrylamide and vinylpyridine the quaternary salts of vinyl pyridine, wherein the molar ratio of anionic to cationic functional groups in the water soluble polymer complex is about 50/1 to about 1.2/1 or from about 0.8/1 to about 1/50, said ratio always being such that there is at least an excess of said water soluble copolymers over the other said water soluble copolymer of at least about 20 mole percent.

* * * * *